United States Patent [19]

Dewyer

[11] Patent Number: 4,545,461
[45] Date of Patent: Oct. 8, 1985

[54] ADAPTOR FOR CONNECTING A GREASE GUN TO FLEXIBLE DRIVE CABLES FOR LUBRICATION PURPOSES

[76] Inventor: Milo Dewyer, 6701 W. Carol Ann Way, Peoria, Ariz. 85345

[21] Appl. No.: 569,291

[22] Filed: Jan. 9, 1984

[51] Int. Cl.⁴ .......................... F16N 1/00; F16N 13/08
[52] U.S. Cl. .................... 184/15.1; 184/105.3; 141/383
[58] Field of Search ............... 184/15.1, 15.2, 105 R, 184/105 B, 105 C; 141/383, 384; 285/94

[56] References Cited

U.S. PATENT DOCUMENTS

| | | | |
|---|---|---|---|
| 2,178,058 | 10/1939 | West | 184/105 X |
| 2,201,426 | 5/1940 | Bratz | 184/15.1 X |
| 2,681,711 | 6/1954 | Sievenpiper | 184/105 R |
| 3,283,854 | 11/1966 | Self | 184/105 R |
| 3,731,764 | 5/1973 | Workman | 184/15.1 |
| 3,828,890 | 8/1974 | Schott et al. | 184/105 R X |
| 3,884,329 | 5/1975 | Steffen | 184/15.1 X |
| 3,889,781 | 6/1975 | Schott et al. | 184/15.1 |

FOREIGN PATENT DOCUMENTS

| | | | |
|---|---|---|---|
| 534220 | 1/1955 | Belgium | 184/105 R |
| 528648 | 7/1955 | Italy | 184/105 R |
| 537584 | 12/1955 | Italy | 184/105 R |
| 752865 | 7/1956 | United Kingdom | 184/105 R |
| 481732 | 10/1975 | U.S.S.R. | 184/15.1 |

*Primary Examiner*—David H. Brown
*Attorney, Agent, or Firm*—Warren F. B. Lindsley

[57] ABSTRACT

An adaptor for connecting a grease gun to a speedometer, odometer, cruise control cable or the like for lubrication thereof which connection can be made at the point of connection of the cable to the transmission of the vehicle being serviced.

2 Claims, 6 Drawing Figures

ADAPTOR FOR CONNECTING A GREASE GUN TO FLEXIBLE DRIVE CABLES FOR LUBRICATION PURPOSES

BACKGROUND OF THE INVENTION

This invention relates to an adaptor for easily connecting a grease gun to a speedometer, odometer, cruise control cable or the like for lubrication purposes at a point remote from its operating meter, head or switch.

Heretofore, the mechanic lubricating a speedometer, odometer and/or cruise control cable had to remove the cable from its meter head to obtain access to the interior of the cable. This required working in a small, relatively unaccessible space in back of the dashboard of the vehicle.

Not only is this type of lubricating function a difficult task, but the time to accomplish the greasing operation is excessive. Thus, a need exists for making this cable lubricating job easier and less time consuming by greasing these cables from under the vehicle at a point where they connect to the transmission of the vehicle, rather than behind the dashboard of the vehicle at a point where the cables connect to their meter head or switch.

SUMMARY OF THE INVENTION

In accordance with the invention claimed, a new and improved adaptor is provided for connecting a grease gun to a speedometer, odometer, cruise control cable or the like at a point where the cable connects to the transmission of the associated vehicle.

It is, therefore, one object of this invention to provide a new and improved adaptor for grease guns.

Another object of this invention is to provide a new and improved adaptor for grease guns which readily connects with speedometer, odometer, cruise control cables or the like at a point where they connect to the transmission of an associated vehicle.

A further object of this invention is to provide a new and novel adaptor for speedometer cables and the like which is adaptable to most domestic and foreign vehicles.

A still further object of this invention is to provide a new and improved adaptor for interconnecting most standard grease guns with the speedometer, odometer and cruise control cables of domestic and foreign vehicles which is easily and efficiently manufactured from readily available parts and materials.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawing, in which:

FIG. 2 is a perspective view partially in section showing the adaptor of FIG. 1 interconnecting a grease gun with a particular type of drive cable for a speedometer, odometer, cruise control or the like;

FIG. 5 is a perspective view partially in section showing the adaptor of FIG. 2 interconnecting a grease gun with another type of drive cable for a speedometer, odometer, cruise control or the like.

DESCRIPTION OF THE PREFERRED EMBODIMENT

Figure 1:
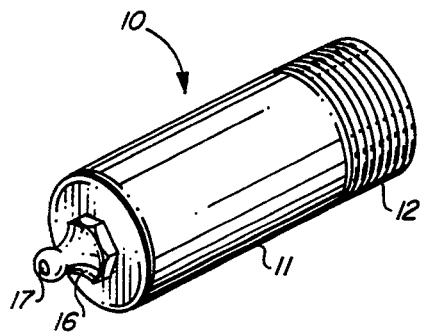
FIG. 1 is a perspective view of an adaptor embodying the invention.

Referring more particularly to the drawing by characters of reference, FIG. 1 discloses an adaptor 10 comprising an elongated hollow cylindrical section 11 which may be approximately two inches in length. The right end of the cylindrical section 11 is provided with external threads 12 for threadedly receiving thereon the knurled collar 13 of an associated speedometer, odometer, cruise control cable 14 or the like which is intended to be greased along its length internally thereof. The threaded end of cylindrical section 11 is provided with an O-ring 15 which is fixedly attached thereto by suitable glue or cement so as to maintain the ring thereon.

The other end of the cylindrical section 11 is provided with a standard grease fitting 16 which is secured therein. The grease fitting is provided with the known spring biased ball 17 which seals the fitting opening when not under pressure from the nozzle end of an associated grease gun 18 shown in FIG. 2.

Figure 2:
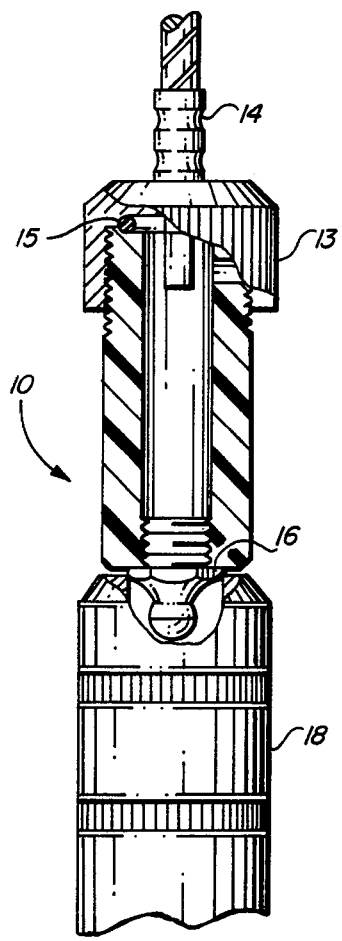
Figure 3:
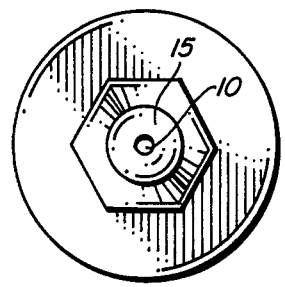
FIG. 3 is a left-end view of FIG. 1.

It should be noted that the adaptor shown in FIGS. 1-3 is designed particularly for General Motors, Chrysler and AMC vehicles, the speedometers, odometers and cruise control cables of which have a knurled collar for connection to a threaded plug or flange provided on the outer surface of the transmission casing of this type of vehicle.

Figure 4:
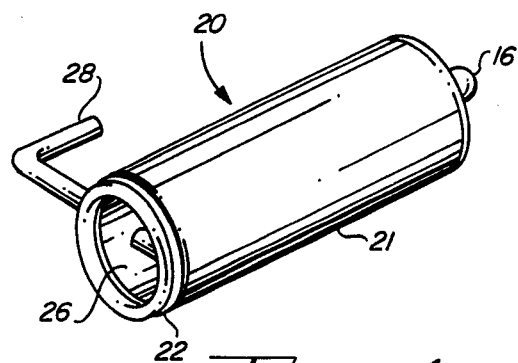
FIG. 4 is a perspective view of a modification of the adaptor shown in FIG. 1.
Figure 5:
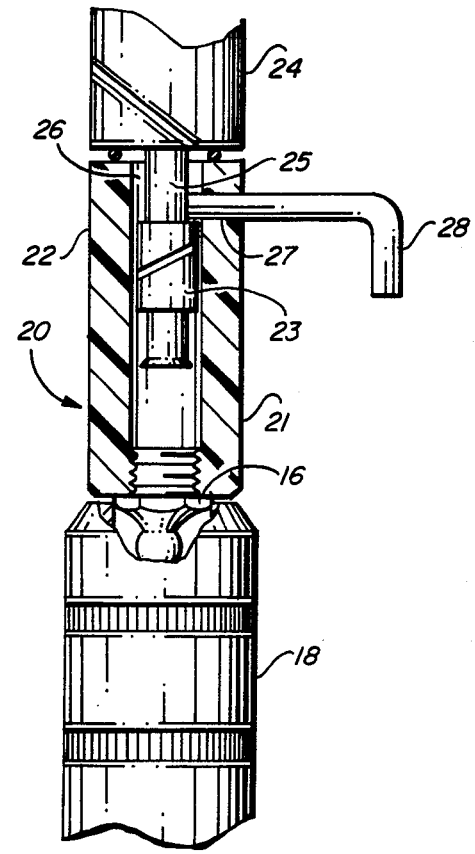
Figure 6:
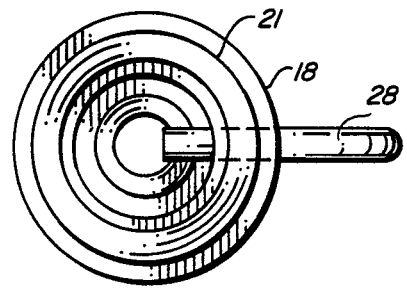
FIG. 6 is a left-end view of FIG. 5.

In order to provide an adaptor for Ford Motor Company products and many foreign vehicles used in the United States, adaptor 10 has been modified, as shown in FIGS. 4-6, to accomodate the connection to a further type of cable terminal end.

As shown in FIGS. 4-6, adaptor 20 comprises a hollow cylindrical section 21, the cable attachment unthreaded end 22 of which is adapted for receiving therein the terminal end 23 of cable 24 of a speedometer, odometer or cruise control cable connected to and driven by the transmission of Ford Motor Company and many foreign vehicles having this type of cable terminal end.

As noted from FIG. 5, terminal end 23 of cable 24 comprises a necked down portion 25 positioned a predetermined distance from the terminal end of the cable which when inserted into the cylindrical opening 26 of end 22 of the cylindrical section 21 is juxtapositioned to an opening 27 extending laterally into the cylindrical section 21. A locking key or pin 28 when inserted in opening 27 of cylindrical section 21 will penetrate to and into contact with the necked down portion 25 of the terminal end 23 of cable 24 to form an interference fit with the terminal end of the cable to lock adaptor 20 to cable 24. Grease gun 18 is attached to grease fitting 16 of adaptor 20 which is mounted in the other end of the cylindrical section 21 of the adaptor in the same manner as shown and described for adaptor 10 of FIGS. 1-3.

Operation

To effectively use the adaptors disclosed, the speedometer cable or other similar driven cable is disconnected from the transmission of the vehicle to be serviced. In the case of a General Motors, Chrysler or AMC vehicle, the knurled nut or collar 13 of their drive cables is unscrewed from an associated threaded flange or plug on the transmission housing, not shown. The adaptor 10 is then threaded into the knurled collar 13 as shown in FIG. 2. The nozzle end of grease gun 18 is then attached to the grease fitting 16 of the adaptor in the known snap on manner, and the required lightweight grease from the grease gun is then injected into cable 14 to grease it along its length up to an associated meter head, not shown.

At this point, the grease gun 18 is removed from the grease fitting 16 of adaptor 10 and the adaptor is unthreaded from the knurled collar 13. The collar is then reattached to the associated plug on the transmission housing and the grease job is completed.

For Ford Motor Company products and others using a cable 24 configuration the same greasing procedure is followed except that adaptor 20 is attached to cable 24 by inserting end 23 of the cable into the open end 26 of cylindrical section 21 and locking pin 28 is then inserted in opening 27 of the section to lock the adaptor to the cable in the manner shown in FIG. 5.

It should be noted that the adaptors disclosed may be manufactured from any suitable metal or plastic and still fall within the scope of this invention.

Although but two embodiments of the invention have been illustrated and described, it will be apparent to those skilled in the art that various changes and modifications may be made therein without departing from the spirit of the invention or from the scope of the appended claims.

I claim:

1. An adaptor for connecting a grease gun to speedometer, odometer, cruise control cables or the like for lubrication purposes comprising:

an elongated hollow cylindrical section, means for detachably connecting one end of said section to a cable to be greased, a grease fitting sealingly mounted in the other end of said section and adapted for receiving in a snap on manner the nozzle end of a grease gun, said one end of said section being provided with an opening extending laterally thereof into the hollow interior of said section for receiving a locking pin and a locking pin for insertion into said opening for engaging in an interference manner a terminal end of an associated cable inserted into said one end of said section.

2. An apparatus comprising:

a cable, an elongated hollow cylindrical section, means for detachably connecting one end of said section to one end of said cable to be greased, a grease fitting sealingly mounted in the other end of said section and adapted for receiving in a snap on manner the nozzle end of a grease gun, said means for detachably connecting comprising an opening extending laterally thereof into the hollow interior of said section for receiving a locking pin, a locking pin for insertion into said opening for engaging in an interference manner a terminal end of an associated cable inserted into said one end of said section, said cable comprising a necked down portion spaced from its terminal end which terminal end of said cable is inserted into said one end of said adaptor to a point where said necked down portion is juxtapositioned to said opening in said section, said locking pin being inserted in said opening of said section to engage said necked down portion of said terminal end of said cable, and a grease gun connected to said grease fitting at said other end of said section.

* * * * *

UNITED STATES PATENT OFFICE
CERTIFICATE OF CORRECTION

Patent No. 4,545,461  Dated October 8, 1985

Inventor(s) Milo Dewyer

It is certified that error appears in the above-identified patent and that said Letters Patent are hereby corrected as shown below:

Claim 1, line 10, cancel "said one end of said section being provided with" and substitute ---said means for detachably connecting comprising---;

Claim 1, line 12, after "pin" add ---,---.

Signed and Sealed this

Fourth Day of February 1986

[SEAL]

Attest:

DONALD J. QUIGG

Attesting Officer    Commissioner of Patents and Trademarks